July 31, 1962  L. J. MALICAY  3,046,714
METHOD OF AND APPARATUS FOR MAKING SEED TAPE
Filed March 16, 1961  4 Sheets-Sheet 1
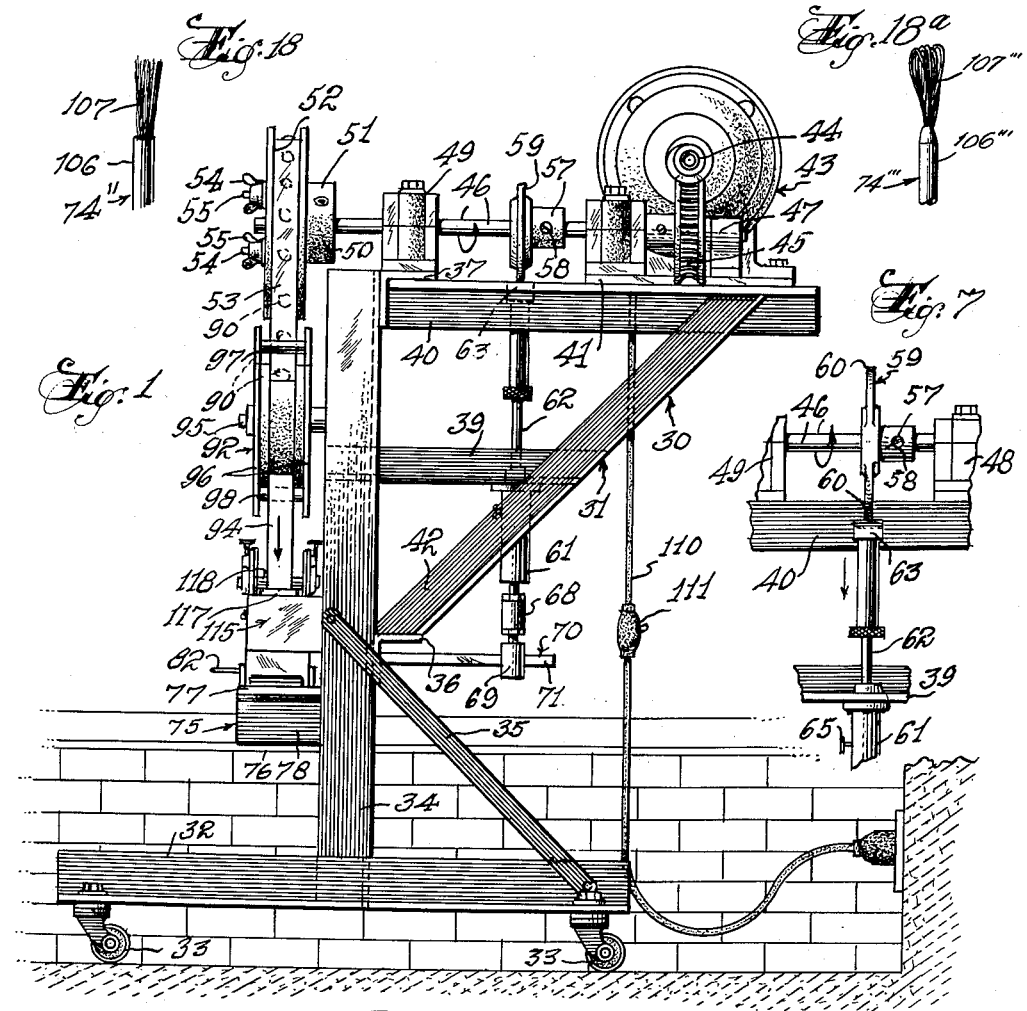
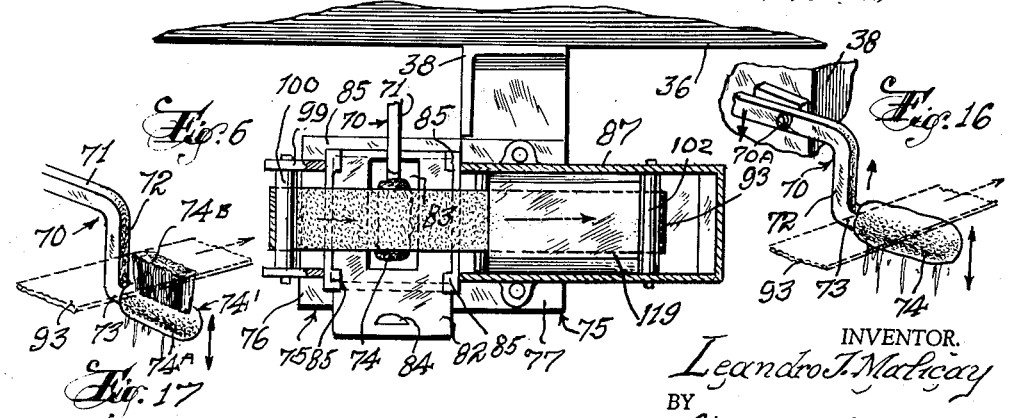
INVENTOR.
Leandro J. Malicay
BY
Victor J. Evans & Co.
ATTORNEYS.

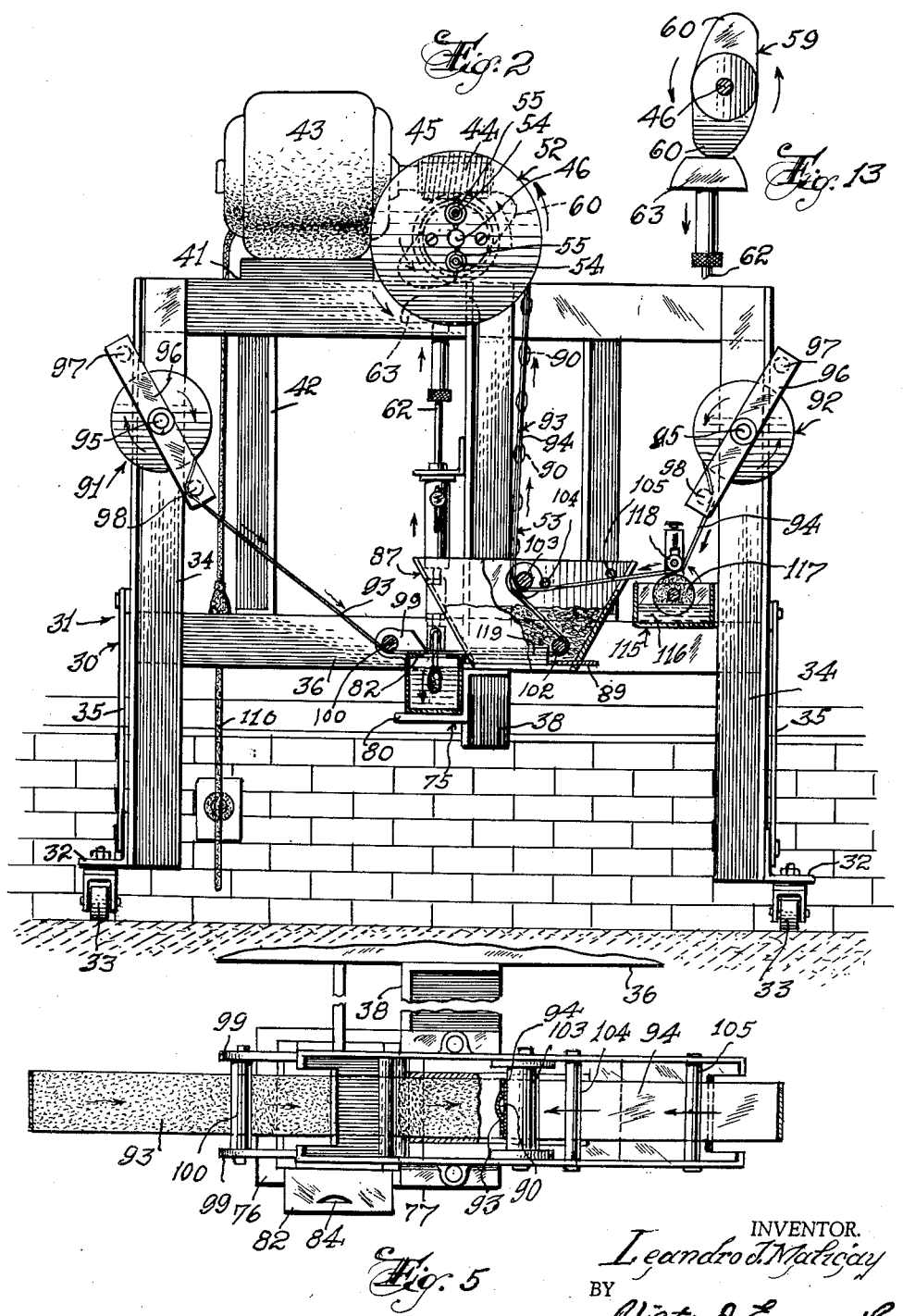

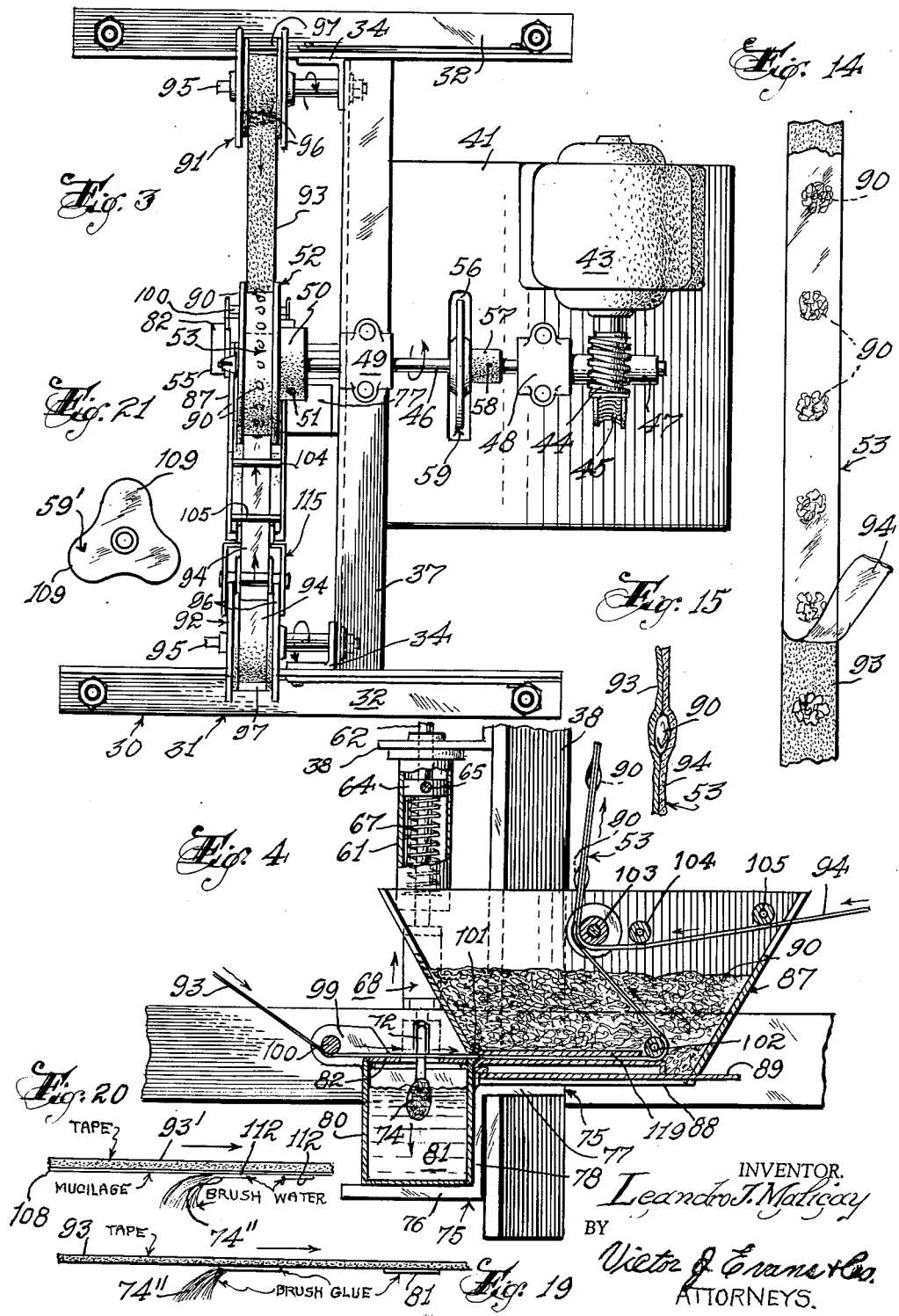

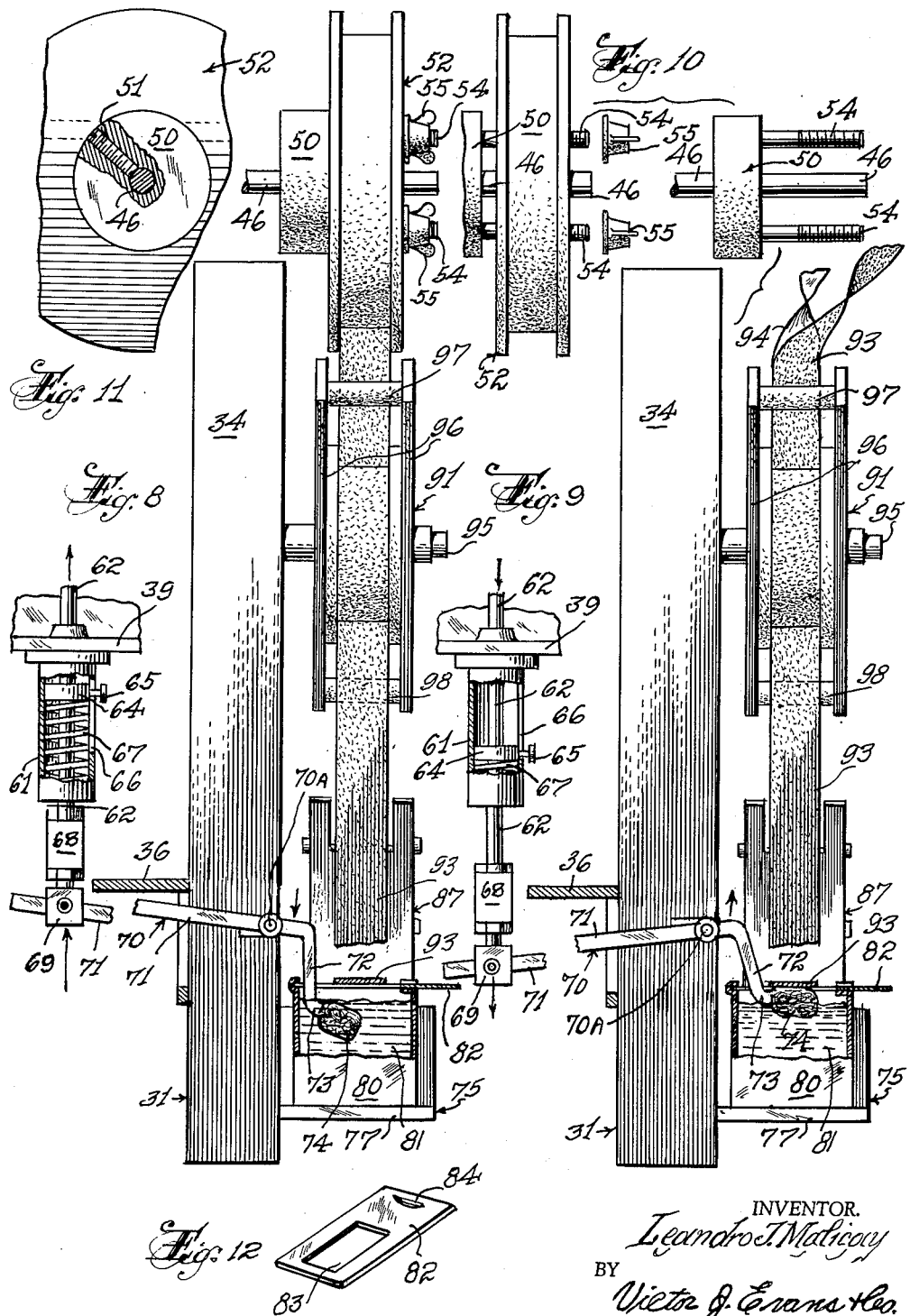

United States Patent Office 3,046,714
Patented July 31, 1962

3,046,714
METHOD OF AND APPARATUS FOR MAKING SEED TAPE
Leandro J. Malicay, P.O. Box 75495, Sanford Station, Los Angeles 5, Calif.
Filed Mar. 16, 1961, Ser. No. 96,293
1 Claim. (Cl. 53—180)

The present invention relates to a seed tape, and more particularly to an improved method or process and apparatus for making the same.

An object of the present invention is to provide a method of and means for making a seed tape wherein there is provided a composite seed tape that consists of a backing strip which may be made of any suitable material such as a paper like material, and wherein there is also provided a transparent covering strip which is adapted to be arranged over the seeds so that the seed tape of the present invention can be efficiently and effectively used for growing flowers, vegetables, or the like from seeds which are held between the backing and transparent strips.

Another object is to provide a seed tape making machine which is adapted to be made portable so that it can be readily moved from place to place as desired, and wherein according to the present invention spaced apart spools of backing material and transparent material are rotatably supported by the framework of the machine, the backing material and transparent material adapted to be guided in a suitable direction or predetermined manner so that after an applicator has intermittently applied adhesive to the backing strip, the backing strip can move through a seed hopper in order to cause the adhesive thereon to pick up the seeds, whereby the transparent covering strip can subsequently be extended over the seeds on the backing strip in order to form the composite or completed seed tape, and wherein the completed seed tape is adapted to be conveniently wound on a takeup reel or spool for subsequent planting or use in the desired manner.

Still another object is to provide such a seed tape making machine which is adapted to be used for making seed tape whereby vegetables, flowers or the like can be efficiently planted in the ground, and wherein by using the seed tape made according to the present invention, the cost and effort involved in thinning out the plants will be minimized, and wherein wastage of seeds will be prevented or minimized, and wherein persons using the seed tape will be able to accurately plant and control the growth of the flowers, vegetables or the like, the present invention permitting various types of crops to be grown with a minimum of cost and effort and wherein such growth can be scientifically regulated or controlled.

Another object is to provide an apparatus of the character described that may be utilized speedily and with precision by even inexperienced operators, and further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIG. 1 is a side elevational view of the seed tape making machine of the present invention.

FIG. 2 is an elevational view taken at right angles to the view shown in FIG. 1, and with parts broken away and in section.

FIG. 3 is a top plan view of the machine.

FIG. 4 is an enlarged fragmentary vertical sectional view showing the hopper mechanism and its associated parts.

FIG. 5 is a fragmentary top plan view showing the seed hopper and its associated parts.

FIG. 6 is a fragmentary horizontal sectional view showing the movement of the tape through the hopper, and with the seeds removed from the hopper for clarity of illustration.

FIG. 7 is a fragmentary elevational view illustrating a portion of the timing mechanism for the adhesive applicator.

FIG. 8 is a fragmentary elevational view, with parts broken away and in section taken approximately through the adhesive container.

FIG. 9 is a view generally similar to FIG. 8 but showing the applicator in a lowered position.

FIG. 10 is a fragmentary disassembled or exploded view showing certain constructional details of the takeup reel and its associated parts.

FIG. 11 is a fragmentary detail view illustrating a portion of the takeup reel.

FIG. 12 is a perspective view of the cover plate for the adhesive container.

FIG. 13 is an enlarged elevational view illustrating the cam mechanism.

FIG. 14 is an elevational view illustrating the composite tape after the same has been made by the method and apparatus of the present invention.

FIG. 15 is a sectional view taken through a portion of the completed seed tape and illustrating how the seed is visible through the transparent cover strip.

FIG. 16 is a fragmentary perspective view illustrating a portion of the applicator.

FIG. 17 is a view similar to FIG. 16 but illustrating a modified type of applicator.

FIG. 18 is a fragmentary elevational view of a further modified applicator, and FIG. 18a is a fragmentary elevational view of another modification.

FIG. 19 is a fragmentary elevational view illustrating a further modification of the means for applying adhesive to the backing strip.

FIG. 20 is a view similar to FIG. 19 but illustrating a still further modification.

FIG. 21 is en elevational view of a modified cam.

Referring in detail to the drawings, and more particularly to FIGS. 1 through 16 of the drawings, the numeral 30 indicates the seed tape making machine of the present invention which is shown to comprise a frame that is indicated generally by the numeral 31, and as shown in the drawings, the frame embodies a pair of horizontally disposed spaced parallel bars 32 which have casters or wheels 33 mounted therebelow. The frame 31 further comprises a pair of spaced parallel vertically disposed legs 34, and the lower ends of the legs 34 are suitably secured to the bars 32 in any suitable manner, as for example by welding, or else suitable securing elements such as bolts, rivets or the like can be used for fastening these parts together. Inclined braces 35 extend between the legs 34 and bars 32 and are secured thereto, as for example as shown in FIG. 1. The numeral 36 indicates a horizontally disposed crosspiece which extends between the pair of legs 34 and which is secured thereto, and the numeral 37 indicates a horizontally disposed top piece, and the top piece 37 extends between the upper ends of the legs 34 and is suitably affixed thereto. As shown in the drawings, a vertically disposed support piece 38 is suitably secured to the top piece 37 and the crosspiece 36, and the numeral 39 indicates a horizontally disposed support element that is affixed to the intermediate portion of the support piece 38, for a purpose to be later described.

The frame further embodies a pair of horizontally disposed spaced parallel arms 40 which are secured to or formed integral with the top piece 37, and the numeral 41 indicates a horizontally disposed platform which is suitably secured to the arms 40. Inclined braces 42 extend between the arms 40 and crosspiece 39 and are secured thereto. The numeral 43 indicates a motor such as a conventional electric motor which may be of the reversible type, and the motor 43 is suitably affixed to the platform 41, there being a worm 44 driven by the motor 43, and the worm 44 meshes with a worm gear 45 that is secured to a horizontally disposed shaft 46, and the shaft 46 is rotatably supported as for example by means of bearings 47, 48 and 49.

The numeral 50 indicates a collar which is mounted on an end of the shaft 46 as for example by means of a set screw 51, and the numeral 52 indicates a takeup reel which is arranged contiguous to the collar 50, and the reel 52 is mounted on the shaft 46, the numeral 53 indicating the composite seed tape that is made according to the present invention and which is wound on the reel 52 for subsequent use or planting in the ground. A plurality of spaced parallel studs 54 extend from the collar 50 through suitable apertures or openings in the takeup reel 52, and fasteners or wing nuts 55 are arranged in threaded engagement with the outer ends of the studs 54 in order to maintain the parts in a proper assembled relation.

The platform 41 is provided with a slot or cutout 56, and the numeral 57 indicates a cylindrical member or sleeve that is secured to the shaft 46, as at 58, and this sleeve 57 provides a hub for a cam 59, FIG. 13. The cam 59 is shown to include diametrically opposed high points or shoulders 60 which are arranged in alignment with the slot 56 in the platform 41.

The numeral 61 indicates a hollow casing or guide unit which is adapted to have its upper end suitably affixed to the support element 39, and a rod 62 is movable or slidable in the casing 61. A head 63 is suitably affixed to the upper end of the rod 62, FIG. 13, and the shoulders 60 of the cam 59 are adapted to selectively engage the head 63 so as to move the rod 62 down with an intermittent motion. A bushing 64 is fixedly secured to the rod 62 within the casing 61, and a securing element 65 extends through an elongated vertically disposed slot 66 in the casing 61 and serves to secure the bushing 64 to the rod 62, and a coil spring 67 is circumposed on the rod 62 below the bushing 64. An adjustable unit 68 is arranged on the lower portion of the rod 62, and a fitting 69 on the lower end of the rod 62 has a support member 70 connected thereto. As shown in the drawings the support member 70 includes a horizontally disposed first portion 71, FIG. 9, and the support member 70 further includes a vertically disposed second portion 72 which terminates in a horizontally disposed third portion 73, and an applicator 74 is suitably affixed to the portion 73 of the support member 70.

There is further provided a bracket which is indicated generally by the numeral 75, and the bracket 75 is adapted to be suitably affixed to the frame of the machine, and for example the bracket 75 may be welded or otherwise secured to the support piece 38 of the frame 31. As shown in FIG. 4 the bracket 75 embodies horizontally disposed offset lower and upper sections 76 and 77 which are interconnected by a vertically disposed section 78, and the numeral 80 indicates a container which is supported on the section 76 of the bracket 75, and the container 80 may be suitably secured in place on the section 76. The container 80 is adapted to hold a suitable quantity of fluid therein, and for example the container 80 may have adhesive as indicated by the numeral 81 therein. The numeral 82 indicates a cover or lid for the container 80, FIG. 12, and the cover 82 is provided with an enlarged slot or opening 83 which is arranged above the applicator 74, and the cover 82 is adapted to have a finger engaging recess 84 therein so as to facilitate the manual movement of the cover 82 on the container 80. The cover 82 is adapted to be held in place below flanges or guide portions 85, FIG. 6.

The machine of the present invention further includes a seed hopper which is indicated generally by the numeral 87, and there is provided in the lower end of the hopper 87 a slidable or movable bottom 88 which can be opened as for example when the seeds 90 in the hopper 87 are to be removed and replaced or the like. The bottom 88 is provided with a recessed portion 89 which is adapted to provide a convenient finger grip that facilitates the manual placement or movement of the bottom element 88.

As shown in the drawings there is provided a pair of opposed spools 91 and 92 which are adapted to hold rolls of backing material 93 and transparent material 94 respectively. The spools 91 and 92 are generally of the same construction and each are adapted to be journaled on or connected to the frame as for example by means of a pin or shaft 95, and a pair of straps or links 96 are provided for each spool 91 and 92, there being pins 97 and 98 extending between the ends of the straps 96 for helping to guide the backing material 93 or transparent covering material 94 to the proper location as the machine is actuated.

The numeral 99 designates each of a pair of spaced apart lugs that are suitably secured to or formed integral with the container 80, FIG. 4, and a horizontally disposed guide member 100 extends between the lugs 99 and is supported thereby, the backing strip 93 adapted to move beneath the guide member 100. As shown in the drawings there is provided in the hopper 87 a slit or cutout 101 through which the backing material 93 is adapted to pass, whereby after the applicator has applied adhesive to one surface or side of the backing strip 93 at spaced apart points therealong, the backing strip can enter the interior of the hopper 87 through the slit 101 so that the adhesive on the backing strip will cause seeds such as the seeds 90 to be adhered to the backing strip at the points covered with the adhesive. The backing strip then is trained around a guide piece 102 in the lower portion of the hopper 87, FIG. 4, and the backing strip then moves in a generally upward direction contiguous to a roller 103, and as shown in the drawings the transparent cover strip 94 is guided into a position contiguous to the backing strip by means of guide elements 104 and 105, whereby there will be formed or provided the composite seed tape 53 which is wound on the takeup reel 52.

Attention is now directed to FIG. 17 of the drawings wherein there is illustrated a modified applicator which is indicated generally by the numeral 74′, and the applicator 74′ is adapted to be used in lieu of or instead of the applicator 74, and the applicator 74′ includes a body portion 74A that may be suitably mounted on a portion such as the portion 73 of the support member 70, and bristles 74B are adapted to be suitably affixed to the body portion 74A.

As shown in FIG. 18 a different type of applicator 74″ may be used when desired or required, and the applicator 74″ includes a stem portion 106 as well as bristles 107. Attention is now directed to FIG. 18a wherein the numeral 74‴ illustrates a still further modified applicator which is shown to comprise a stem portion 106‴ as well as wire elements 107‴. The applicator 74‴ of FIG. 18a is in the nature of a steel wire brush and will withstand more usage or wear as for example as compared to the bristles, since the applicator must move up and down through the tank of glue. In other words in FIG. 18a the applicator 74‴ is in the nature of a wire steel brush which has fine steel wires 107‴ and are adapted to have a substantially U-shape, and the use of the applicator 74‴ is substantially the same as the applicator 74″ of FIG. 18 for example. The applicator 74‴ can be used wherever the same is needed or required, as for example in connection with tomato seeds, cabbage seeds, carrots, turnips and the like. Lettuce seeds are very fine and only two steel wires 107‴ are needed to do the job. Sugar beet seeds and rice seeds may need more wires such as eight wires 107''', and the number of wires 107''' can be varied as desired or required in order to do the job at hand.

Referring now to FIG. 20 of the drawings, there is illustrated a further modification wherein the numeral 93' indicates a backing strip which is adapted to have adhesive previously applied thereto in any suitable manner, and an applicator such as the applicator 74'' can be used for intermittently applying water to spaced apart portions of the adhesive 108 so as to actuate such spaced apart portions of the adhesive in order to permit these activated portions to pick up seeds as the backing strip 93' moves through the seed hopper.

In FIG. 21 there is illustrated a modified cam which is indicated generally by the numeral 59', and the cam 59' is adapted to be used instead of the cam 59, and it will be seen that in FIG. 21 the cam 59' has a generally triangular shape so that it includes three spaced apart lobes or shoulders 109.

In FIG. 1 the numeral 110 indicates an input wire or conductor line which is adapted to be used for connecting the motor 43 to a suitable source of electrical energy, and the line or wire 110 is adapted to have a suitable manually operable control switch 111 therein.

From the foregoing, it is apparent that there has been provided a method of and means for making seed tape such as the seed tape 53, and wherein such seed tape can be effectively and efficiently used for growing various types of crops, vegetables, flowers, plants or the like. In use, with the parts arranged as shown in the drawings, the machine 30 of the present invention will be seen to comprise a frame 31 that is mounted on the casters 33 so as to facilitate the movement of the machine to a desired location, and the motor 43 of the machine is adapted to be connected to a suitable source of electrical energy, as for example by means of the conductor 110, and the motor 43 can be turned on or off by suitably actuating the hand switch 111.

With the parts arranged as shown, a roll of backing material as indicated by the numeral 93 which may consist of relatively heavy paper or the like, is adapted to be arranged on the spool 91, and a roll of transparent covering material such as a suitable transparent plastic material as indicated by the numeral 94 is adapted to be arranged on the spool 92. It will be seen that after initially threading or starting the backing strip and covering strip through the machine and starting the completed or composite seed tape 53 on the takeup reel 52, that as the motor 43 is actuated, the worm 45 will cause rotation of the shaft 46 due to the provision of the gear 45 which meshes with the worm 44, and as the shaft 46 rotates, it will cause rotation of the takeup reel 52 whereby as the seed tape 53 is formed, the seed tape will be automatically wound upon the reel 52. After the reel 52 is loaded with seed tape, the actuation of the motor 43 can be stopped, and the wing nuts 55 can be loosened from the studs 54 whereby the reel 52 can be disconnected from the shaft 46 and from the studs 54 so that the seed tape 53 on the reel 52 can be used for planting in the ground in order to promote the growth of various types of materials, depending upon the type of seed that is used in making the seed tape. When it is desired to again use the machine of the present invention a suitable takeup reel 52 is again arranged on an end of the shaft 46 and the reel 52 is held in place by means of the fasteners or wing nuts 55 which are threaded on the studs 54.

It is to be noted that as the reel 52 is rotated, it will have a tendency to pull up on the seed tape 53, FIG. 2, and this will have the effect of continuously pulling the proper amount of backing material 93 and covering strip material 94 from the spools 91 and 92 respectively.

It will be noted that the backing strip 93 is pulled or unwound from its spool 91, and this backing material 93 moves under the pin 98 and is adjacent to the spool 91, and this backing material 93 will then be moved under the guide 100 and moves over the cover 82, and the machine is properly timed or constructed so that with the material 93 moving across the cover 82, the applicator 74 will be intermittently moved up and down, and as the applicator 74 moves up it will carry some of the adhesive 81 upwardly through the slot 83 in the cover 82 whereby this adhesive will be applied to spaced apart portions of the backing material 93. After the applicator 74 touches the backing strip 93 and applies adhesive to the backing strip, the applicator 74 will move downwardly so as to replenish the adhesive on the applicator and this action will be continuous in order to apply the adhesive to the proper areas of the backing strip 93. After the backing strip 93 has had the adhesive applied thereto, the backing strip will move through the slit or cutout 101 in the hopper 87 and as the backing strip with the adhesive thereon moves through the hopper, seeds 90 will adhere to those portions of the backing strip that have the adhesive thereon, and the backing strip with the seeds thereon will then travel upwardly as shown in FIG. 4 for example and when the backing strip with the seeds thereon reaches the roller 103, the transparent cover strip 94 will be guided into engagement with the backing strip, and the adhesive on the backing strip will be sufficient to maintain the backing strip and transparent cover strip firmly secured together. Due to the provision of the transparent covering strip 94, the user will be able to readily view or observe the seeds 90 which are held between the strips 93 and 94 so that the user can readily observe whether or not the machine is producing the seeds of the desired spacing or arrangement so that if necessary corrective action can be taken to rectify any faulty functioning of the machine.

The intermittent or up and down action of the applicator 74 is brought about due to the provision of the timing mechanism which includes the cam 59 that is suitably mounted on the shaft 46 as for example by means of the set screw 58 which extends through the hub 57 of the cam 59, and it is to be noted that as the shaft 46 is rotated by the motor 43, the cam 59 will likewise be rotated so that the diametrically opposed high points are shoulders 60 of the cam 59 will alternately move into and out of engagement with the head 63 on the upper end of the rod 62. This will cause the rod 62 to be alternately depressed or moved downwardly, and as a high point 60 passes beyond the head 63, the coil spring 67 will function as a return spring so as to bear against the bushing 64 in order to return the rod 62 and its associated parts to a raised position ready for the next downward movement upon engagement of a high point 60 with the head 63. As the rod 62 is moved downwardly by the cam 59, the fitting 69 on the lower end of the rod 62 will move downwardly so as to pivot the support member 70 in a counterclockwise direction, FIG. 8, the support member being pivotally supported as at 70A, and this will carry or push the applicator 74 upwardly into contact with the tape. Then, as the return spring 67 moves the rod 62 upwardly, the support member 70 will pivot in a reverse direction on its fulcrum 70A, so that the applicator 74 will move downwardly and out of contact with the strip 93. Thus, this mechanism insures that the adhesive will be applied to a strip such as the strip 93 through the slot 83 in the cover 82.

The securing element 65 extends through the vertically disposed elongated slot 66 in the casing 61 so as to help maintain the rod 62 and its associated parts in a properly aligned position in order to prevent accidental rotation of the rod 62 in the casing 61.

Suitable bearings, braces and the like can be used wherever desired or required.

Instead of using the applicator 74, the applicator 74' of FIG. 17 can be used, and in FIG. 17 the applicator 74' includes bristles 74B that are suitably secured to the body portion 74A, and the body portion 74A is adapted to be suitably mounted on the portion 73 of the support member 70, and the applicator 74' can be used for intermittently applying adhesive such as the adhesive 81 onto a backing strip 93.

A further modified applicator is indicated by the numeral 74" in FIG. 18, and in FIG. 18 the stem 106 of the applicator 74" may be suitably secured to a portion such as the portion 73 of a support member 70, and the bristles 107 can be used for applying adhesive to a backing strip.

In FIG. 19 there is illustrated diagrammatically or schematically the application of adhesive 81 at spaced apart areas or points along the backing tape or strip 93, and an applicator such as the applicator 74" can be used in applying the adhesive or glue 81.

In FIG. 20 there is illustrated a further modification wherein the tape 93' is of a type that has mucilage or adhesive applied continuously therealong, that is the tape 93' is furnished with one side or surface thereof continuously and completely coated with adhesive 108, and then an applicator such as the applicator 74" is adapted to apply water, such as the water 112, in order to activate spaced apart portions of the adhesive 108 in order to permit these activated portions to pick up seeds. That is, the adhesive 108 of FIG. 20 is of the type which remains inactive until water is applied thereto, so that by applying water or moisture to intermittently spaced apart portions of the adhesive 108 as indicated by the numeral 112, these spaced apart portions of the adhesive which are moistened will be activated so that by passing such tape 93' through the seed hopper 87, seeds will be picked up at the points 112, and then by bringing the transparent strip 94 in proximity to the tape 93', the activated adhesive will cause the transparent covering strip to be adhered thereto in order to form the completed seed tape 53.

A modified cam is indicated in FIG. 21 and this cam is indicated by the numeral 59', and it will be seen that there are three lobes or nodes 109 on the cam 59' and such a cam may be used for varying or changing the timing of the intermittently operated applicator as for example under certain conditions it is desired to have the applicator apply adhesive to the backing strip in such a manner that the seeds will be spaced further apart or closer together, and one way of accomplishing this is by the use of different shapes or types of cams.

Suitable material can be used for making the various elements or parts as desired or required.

The motor 43 not only supplies power for operating the takeup reel, but in addition serves to operate the intermittently actuated applicator, and the applicator can either apply glue to the tape, or else the applicator can be used for supplying water to a previously constructed or glued tape 93'. The tapes are properly guided through the machine as previously stated so that when the tapes come together in the vicinity of the roller 103, they will form the completed seed tape 53 which is ready to be wound on the takeup reel. The use of the transparent tape or strip 94 which may be made of a suitable plastic, serves to insure that the seeds can be seen at all times, and also such a material 94 serves to protect the seeds until they are properly planted in the ground. The cam serves to space the seeds at the proper distance on the tape whereby the seeds can be arranged in the tape scientifically according to the desired spacing that is to be accomplished.

With the present invention a seed tape can be readily and efficiently produced so that farmers or other users will know exactly how much seed is to be used in a particular locality and when the tape is being used, the tape can be stretched on a line along the ground and the tape can be buried several inches in the ground, and such a seed tape will minimize the cost of producing vegetable crops and the like, and the seeds can be properly spaced in the tape in order to insure that the crops will germinate at the desired distances. The seed tape can be readily removed from the machine when it is desired to plant the seed tape, and the entire tape may be made of a suitable material that will disintegrate when placed in the ground, and in addition the entire tape may be suitably impregnated with a fertilizer type of substance so as to help promote growth or germination of the seeds held therein. In addition, there will be no wastage of adhesive or glue, and the device or machine is constructed so that the seeds 90 can be dumped or placed in the hopper 87 in random fashion, and nevertheless the adhesive on the tape will pick up the seeds from the hopper at the proper spacing or location. The transparent tape 94 will entirely cover the side of the tape 93 that has the adhesive thereon, so that there will be no adhesive exposed and this will insure that the tape will not accidentally stick on the machine as it moves through the machine. The adhesive not only maintains the seeds in place on the tape, but in addition the adhesive serves to maintain the strips 93 and 94 bonded together. Different types or shapes of cams can be utilized to space the seeds where desired on the tape. When the spools of paper 93 or plastic material 94 are used up, this material can be readily replaced so as to permit the machine to continuously turn out the finished seed tape.

It is to be noted that if desired the function and location of the strips or tapes 93 and 94 can be reversed. For example referring to FIG. 2, the strip or tape 93 may be a transparent tape such as a cellophane type of material, and the numeral 94 may represent an opaque or paper like backing strip. Thus, the tapes may be reversed, and even with the parts reversed, one of the tapes will be transparent and the other will be opaque.

Also, it is to be understood that any desired type of seed can be handled or utilized in the present invention, and the present invention is not restricted to any particular shape or size or type of seed. When different types of seeds are being handled, certain of the parts may be changed somewhat, as for example when different types of seeds are being used, the speed of the various parts can be varied or regulated, and also different sizes of tapes can be used to accommodate different types of seeds, and the timing mechanism which includes the cams can be varied when desired or required in order to permit the present invention to properly operate for such different types of seeds.

In addition, the present invention is not restricted to any particular shape or type of brush or applicator, and in fact any desired or suitable type of brush or applicator can be used as needed or desired or required. Suitable fastening means can be provided for fastening the applicators in place.

As shown in FIG. 2 for example, a container 115 is adapted to be provided and suitably supported on the framework of the machine, and the container 115 is adapted to have a quantity of fluid such as water 116 therein. Rollers 117 and 118 are arranged as shown in conjunction with the container 115, and the roller 118 may be spring pressed in place whereby moisture 116 from the container 115 can be applied to the tape 94 in order to moisten the tape before it is moved into position contiguous to the tape 93.

In addition, a guide member 119 is arranged in the lower portion of the seed hopper 87, and this guide member 119 serves to maintain the tape such as the tape 93 in its proper aligned position and serves to insure that the seeds will not come into contact with the tape 93 until the tape moves beyond the end portion of the guide member 119.

Minor changes in shape, size and rearrangement of details coming within the field of invention claimed may be resorted to in actual practice, if desired.

What is claimed is:

In a machine for making seed tape, a frame including spaced parallel horizontally disposed bars, casters mounted below said bars, a pair of spaced parallel vertically disposed legs extending upwardly from said bars and secured thereto, spaced apart inclined braces extending between said legs and bars and secured thereto, a horizontally disposed cross piece extending between said legs and secured thereto, a horizontally disposed top piece extending between the upper ends of said legs and affixed thereto, a vertically disposed support piece secured to said top piece and cross piece, a horizontally disposed support element affixed to the intermediate portion of said support piece, a pair of spaced parallel horizontally disposed arms secured to said top piece, inclined braces extending between said arms and cross piece and secured thereto, a horizontally disposed platform affixed to said arms, a motor supported on said platform, a worm driven by said motor, a horizontally disposed shaft rotatably supported above said platform, a gear on said shaft meshing with said worm, a collar connected to an end of said shaft, a plurality of spaced apart studs extending from said collar and secured thereto, a takeup reel mounted on said shaft and having said studs extending therethrough, fasteners engaging the ends of said studs, there being a slot in said platform, a cam affixed to the intermediate portion of said shaft and said cam registering with said slot, a casing depending from said support element and secured thereto, a vertically disposed rod movably arranged in said casing, a head on the upper end of said rod for selective engagement by said cam, a fitting on the lower end of said rod, a support member including a portion connected to said fitting, an applicator connected to said support member, a bracket affixed to said support piece and said bracket including horizontally disposed upper and lower sections, a fluid holding container mounted on the lower section of said bracket, a cover on said container and said cover having an opening therein arranged above the applicator, a seed holding hopper secured to the upper section of said bracket, and said hopper including a removable bottom, first and second opposed spools rotatably supported by said legs for supporting rolls of backing material and transparent material respectively, spaced apart straps straddling said spools, pins extending between the ends of said straps, a pair of spaced apart lugs affixed to said container, a horizontally disposed guide member extending between said lugs and said guide member adapted to have backing material move therebelow from said first spool, and said backing material moving across the top of the cover of the container, there being a slit in said hopper for the ingress therethrough of the backing material, a horizontally disposed guide piece in the lower portion of the hopper and said backing material moving below said guide piece, a roller journaled in the upper portion of the hopper, and a pair of spaced apart guide elements in the upper portion of the hopper for guiding transparent material from the second spool to the vicinity of the roller.

References Cited in the file of this patent
UNITED STATES PATENTS

| | | |
|---|---|---|
| 1,987,500 | Wild | Jan. 8, 1935 |
| 2,197,594 | Rowell | Apr. 16, 1940 |

FOREIGN PATENTS

| | | |
|---|---|---|
| 1,098,668 | France | Mar. 9, 1955 |